(12) United States Patent
Balabine

(10) Patent No.: US 12,164,578 B2
(45) Date of Patent: *Dec. 10, 2024

(54) METHOD, APPARATUS, AND COMPUTER-READABLE MEDIUM FOR DETERMINING A DATA DOMAIN ASSOCIATED WITH DATA

(71) Applicant: INFORMATICA LLC, Redwood City, CA (US)

(72) Inventor: Igor Balabine, Menlo Park, CA (US)

(73) Assignee: INFORMATICA LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,400

(22) Filed: Apr. 25, 2023

(65) Prior Publication Data

US 2024/0028650 A1   Jan. 25, 2024

Related U.S. Application Data

(63) Continuation of application No. 15/666,065, filed on Aug. 1, 2017, now Pat. No. 11,669,574.

(51) Int. Cl.
| | | |
|---|---|---|
| G06F 7/00 | (2006.01) | |
| G06F 16/31 | (2019.01) | |
| G06F 16/33 | (2019.01) | |
| G06F 16/93 | (2019.01) | |
| G06F 40/205 | (2020.01) | |
| G06F 40/211 | (2020.01) | |
| G06F 40/216 | (2020.01) | |

(Continued)

(52) U.S. Cl.
CPC ............ *G06F 16/93* (2019.01); *G06F 16/313* (2019.01); *G06F 16/3347* (2019.01); *G06F 40/205* (2020.01); *G06F 40/211* (2020.01); *G06F 40/216* (2020.01); *G06F 40/284* (2020.01); *G06F 40/30* (2020.01)

(58) Field of Classification Search
CPC .... G06F 16/93; G06F 16/3347; G06F 16/313; G06F 40/284; G06F 40/211; G06F 40/205; G06F 40/216; G06F 40/30
USPC .................................................. 707/600–899
See application file for complete search history.

(56) References Cited

U.S. PATENT DOCUMENTS

2017/0195125 A1* 7/2017 Heppe .................. H04L 63/123

* cited by examiner

*Primary Examiner* — Isaac M Woo
(74) *Attorney, Agent, or Firm* — Amardeep S. Grewal; Reed Smith LLP

(57) ABSTRACT

A system, method and computer-readable medium for determining a data domain associated with data, including parsing a document to generate one or more document indexes corresponding to the document, the one or more document indexes comprising a plurality of index terms and location information, determining a syntactic confidence score corresponding to a non-dictionary term in the plurality of index terms based on a syntactic analysis of the non-dictionary term, determining a proximity confidence score corresponding to the non-dictionary term based on the location information and at least one proximity query associated with the non-dictionary term and one or more other terms in the document index, determining a semantic confidence score based on a plurality of dictionary terms in the plurality of index terms, and determining an overall confidence score corresponding to the non-dictionary term based on the syntactic confidence score, the proximity confidence score, and the semantic confidence score.

21 Claims, 11 Drawing Sheets

(51) Int. Cl.
*G06F 40/284* (2020.01)
*G06F 40/30* (2020.01)

| | PURCHASE ORDER | |
|---|---|---|
| Informatica LLC | | |
| 2000 Seaport Boulevard | DATE | 7/31/2017 |
| Redwood City, CA 94666 | PO # | 123456 |
| Phone: (650) 385-5000 | | |
| Fax: (650) 385-5001 | | |
| Website: www.informatica.com | | |

| VENDOR | SHIP TO |
|---|---|
| Ministry of Truth | Mata Hari |
| Department of Ultimate Truth | Informatica LLC |
| 666 George Orwell Street | 2000 Seaport Blvd |
| Mukhosransk, Siberia 99999 | Redwood City, CA94666 |
| Phone: (900) 900-0909 | (650) 385-5000 |
| Fax: (900) 900-0999 | |

| REQUISITIONER | SHIP VIA | F.O.B. | SHIPPING TERMS |
|---|---|---|---|
| Rosa Klebb | Lunar Orbit | | Same day FedEx |

| ITEM # | DESCRIPTION | QTY | UNIT PRICE | TOTAL |
|---|---|---|---|---|
| [23423423] | Poisoned tip umbrellas | 15 | 150.00 | 2,250.00 |
| [45645645] | Rubber ducky, yellow, lethal | 1 | 75.00 | 75.00 |

| | SUBTOTAL | 2,325.00 |
|---|---|---|
| Comments or Special Instructions | TAX | - |
| | SHIPPING | - |
| | OTHER | - |
| | TOTAL | $ 2,325.00 |

If you have any questions about this purchase order, please contact
Masha Pashina (650) 385-1313 mpashina@informatica.com

Raw Document Index

| | | |
|---|---|---|
| Count 2 [#] | [ ] | # |
| Count 1 [$] | [ ] | $ |
| Count 6 [-LRB-] | [PHO] | ( |
| Count 6 [-RRB-] | [PHO] | ) |
| Count 7 [,] | [LOC] | , |
| Count 19 [:] | [GEN] | - |
| Count 9 [.] | [ ] | . |
| Count 19 [CD] | [NUM] | 0 |
| Count 1 [CD] | [NUM] | 1 |
| Count 1 [CD] | [ ] | 10 |
| Count 1 [CD] | [ ] | 123456 |
| Count 1 [CD] | [NUM] | 15 |
| Count 1 [CD] | [NUM] | 150.00 |
| Count 1 [CD] | [ ] | 17 |
| Count 1 [CD] | [NUM] | 2,250.00 |
| Count 2 [CD] | [NUM] | 2,325.00 |
| Count 2 [CD] | [LOC] | 2000 |
| Count 1 [CD] | [ ] | 2008-2015 |
| Count 1 [CD] | [NUM] | 23423423 |
| Count 1 [CD] | [ ] | 385-1313 |
| Count 2 [CD] | [PHO] | 385-3000 |
| Count 1 [CD] | [PHO] | 385-3001 |
| Count 1 [CD] | [ ] | 42 |
| Count 1 [CD] | [NUM] | 45645645 |
| Count 1 [CD] | [ ] | 6 |
| Count 4 [CD] | [PHO] | 650 |
| Count 1 [CD] | [GEN] | 666 |
| Count 2 [CD] | [NUM] | 75.00 |

| | | |
|---|---|---|
| Count 2 [CD] | [PHO] | 900 |
| Count 1 [CD] | [PHO] | 900-0909 |
| Count 1 [CD] | [ ] | 900-0999 |
| Count 1 [CD] | [LOC] | 94666 |
| Count 1 [CD] | [NUM] | 99999 |
| Count 9 [:] | [ ] | : |
| Count 1 [NNP] | [LOC] | Blvd |
| Count 1 [NNP] | [LOC] | Boulevard |
| Count 1 [IN] | [ ] | By |
| Count 1 [NNP] | [LOC] | CA |
| Count 1 [NNP] | [GEN] | CA94666 |
| Count 2 [NNP] | [LOC] | City |
| Count 1 [NNS] | [ ] | Comments |
| Count 1 [NNP] | [ ] | DATE |
| Count 1 [NNP] | [ ] | DESCRIPTION |
| Count 1 [NNP] | [ORG] | Department |
| Count 2 [VB] | [ ] | Do |
| Count 2 [NN] | [ ] | EULA_privateuse |
| Count 2 [NNP] | [ ] | ExcelTemplates |
| Count 1 [NNP] | [ ] | F.O.B. |
| Count 2 [NN] | [ ] | Fax |
| Count 1 [NNP] | [ ] | FedEx |
| Count 1 [NNP] | [GEN] | George |
| Count 1 [NNP] | [PER] | Hari |
| Count 1 [NNP] | [ ] | ITEM |
| Count 1 [IN] | [ ] | If |
| Count 2 [NNP] | [ORG] | Informatica |
| Count 1 [NNS] | [ ] | Instructions |

302

303 — Count 2 [NNP] [ORG] Informatica
303A — 303B — 303C — 303D

Fig. 3B

Dictionary Terms Document Index

| | | |
|---|---|---|
| Count 1 [NN] | [ ] | agreement |
| Count 1 [JJ] | [ ] | associated |
| Count 1 [NNS] | [ ] | comment |
| Count 1 [NN] | [ ] | contact |
| Count 1 [NN] | [ ] | content |
| Count 1 [NNS] | [ ] | copy |
| Count 2 [VBN] | [ ] | copyright |
| Count 1 [NN] | [ ] | day |
| Count 1 [VB] | [ ] | delete |
| Count 1 [NN] | [ ] | description |
| Count 2 [NN] | [ ] | fax |
| Count 1 [NN] | [ ] | gallery |
| Count 3 ["] | [ ] | html |
| Count 1 [VBG] | [ ] | include |
| Count 1 [NNS] | [ ] | instruction |
| Count 1 [NN] | [ ] | item |
| Count 1 [NNS] | [ ] | law |
| Count 1 [VB] | [ ] | learn |
| Count 3 [NN] | [ ] | license |
| Count 1 [NNS] | [ ] | modification |
| Count 1 [JJ] | [ ] | online |
| Count 3 [NN] | [ ] | order |
| Count 2 [NN] | [ ] | phone |
| Count 1 [NN] | [ ] | price |
| Count 3 [NN] | [ ] | purchase |
| Count 1 [NNS] | [ ] | question |
| Count 1 [NN] | [ ] | requisitioner |
| Count 1 [VB] | [ ] | review |
| Count 3 [NN] | [ ] | ship |
| Count 1 [NN] | [ ] | shipping |
| Count 1 [JJ] | [ ] | special |
| Count 1 [NN] | [ ] | spreadsheet |
| Count 1 [VB] | [ ] | submit |
| Count 1 [JJ] | [ ] | subtotal |
| Count 1 [NN] | [ ] | tax |
| Count 4 [NN] | [ ] | template |
| Count 1 [NNS] | [ ] | term |
| Count 2 [JJ] | [ ] | total |
| Count 1 [NN] | [ ] | unit |
| Count 1 [NN] | [ ] | vendor |
| Count 2 [NN] | [ ] | website |
| Count 1 [NN] | [ ] | work |
| Count 2 [NNS] | [ ] | worksheet |

Non-Dictionary Terms
Document Index

| | | |
|---|---|---|
| Count 1 [NNP] | [LOC] | Blvd |
| Count 1 [NNP] | [LOC] | Boulevard |
| Count 1 [NNP] | [LOC] | CA |
| Count 1 [NNP] | [GEN] | CA94666 |
| Count 2 [NNP] | [LOC] | City |
| Count 1 [NNP] | [ORG] | Department |
| Count 1 [NNP] | [ ] | F.O.B. |
| Count 1 [NNP] | [GEN] | George |
| Count 1 [NNP] | [PER] | Hari |
| Count 2 [NNP] | [ORG] | Informatica |
| Count 1 [NNP] | [PER] | Klebb |
| Count 2 [NNP] | [ORG] | LLC |
| Count 1 [NN] | [GEN] | Lunar |
| Count 1 [NN] | [PER] | Masha |
| Count 1 [NNP] | [PER] | Mata |
| Count 1 [NNP] | [ORG] | Ministry |
| Count 1 [NNP] | [LOC] | Mukhosransk |
| Count 1 [CC] | [GEN] | Orbit |
| Count 1 [NNP] | [GEN] | Orwell |
| Count 1 [NNP] | [PER] | Pashina |
| Count 1 [VBN] | [GEN] | Poisoned |
| Count 1 [NN] | [ORG] | PurchaseOrder |
| Count 2 [NNP] | [LOC] | Redwood |
| Count 1 [NNP] | [PER] | Rosa |
| Count 1 [NNP] | [GEN] | Rubber |
| Count 2 [NNP] | [LOC] | Seaport |
| Count 1 [NNP] | [LOC] | Siberia |
| Count 1 [NNP] | [LOC] | States |
| Count 1 [NNP] | [GEN] | Street |
| Count 2 [NNP] | [ORG] | Truth |
| Count 1 [NNP] | [ORG] | Ultimate |
| Count 1 [NNP] | [LOC] | United |

Generate a reduced document term matrix by performing singular value decomposition on a document term matrix corresponding to a plurality of documents

701

Merge a dictionary terms index corresponding to the plurality of dictionary terms with the reduced document term matrix

702

Determine a document vector corresponding to the document based at least in part on one or more terms corresponding to the document in the reduced document term matrix

703

Compute one or more degrees of similarity between the document vector and one or more reference document vectors corresponding one or more other documents in the reduced document term matrix

704

Identify the one or more topics associated with the document based at least in part on the computed one or more degrees of similarity and one or more of the plurality of topics associated with the plurality of documents

METHOD, APPARATUS, AND COMPUTER-READABLE MEDIUM FOR DETERMINING A DATA DOMAIN ASSOCIATED WITH DATA

BACKGROUND

Determination of a data object's domain enables establishment of proper security controls for that data. For example, data masking, or redacting, is an important data management technology which prevents access to sensitive data by unauthorized users. In order to determine what data should be masked, redacted, or encrypted, it is necessary to determine the data domain or class of the data. Data belonging to sensitive data domains (such as social security numbers, telephone numbers, or other personal information) can then be handled appropriately, such as through data masking. As used herein, data domain is used interchangeably with the terms "object class," "data class," "data object class," and "class." Examples of sensitive data domains include social security numbers, names, addresses, and/or credit card numbers.

In the existing art, sensitive data object instance (e.g. social security numbers, credit card numbers, personal names) attribution is accomplished through regular expression matching and lookup tables. This limited approach is susceptible to producing excessive false positives and named data type attribution failures, particularly in unstructured documents.

Accordingly, improvements are needed in systems for determining a data domain associated with data in a document.

BRIEF DESCRIPTION OF THE DRAWINGS

FIGS. 3A-3D illustrate examples of a document and indexes generated from the document according to an exemplary embodiment.

FIG. 7 illustrates a flowchart for identifying one or more topics associated with the document according to an exemplary embodiment.

DETAILED DESCRIPTION

While methods, apparatuses, and computer-readable media are described herein by way of examples and embodiments, those skilled in the art recognize that methods, apparatuses, and computer-readable media for determining a data domain associated with data are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that solve the problem of detection of sensitive data in unstructured documents. The disclosed method, apparatus, and computer-readable medium utilizes a novel machine learning based approach to improving quality of named data attribution using multilateral syntactic, semantic and contextual analysis of the input data. The disclosed techniques reduce false positives in the process of a data object instance attribution to a class of named entities, referred to herein as a data domain.

As described in this disclosure, the present application utilizes novel approach which combines traditional syntax-based named data object attribution methods with semantic analysis of a context in which said data object is considered and semantically related terms proximity analysis of the setting in which said data object is situated. The results of syntactical, semantically related terms proximity and semantical context analysis are further combined by the means of a Bayesian inference to make an accurate conclusion about said data object instance type attribution.

As used herein, a data object can refer to any data in a document, such as an unstructured document. For example, the data object can refer to numbers, words, letters, phrases, sequences of alphanumeric characters, symbols, or any combination thereof in a document.

Figure 1:
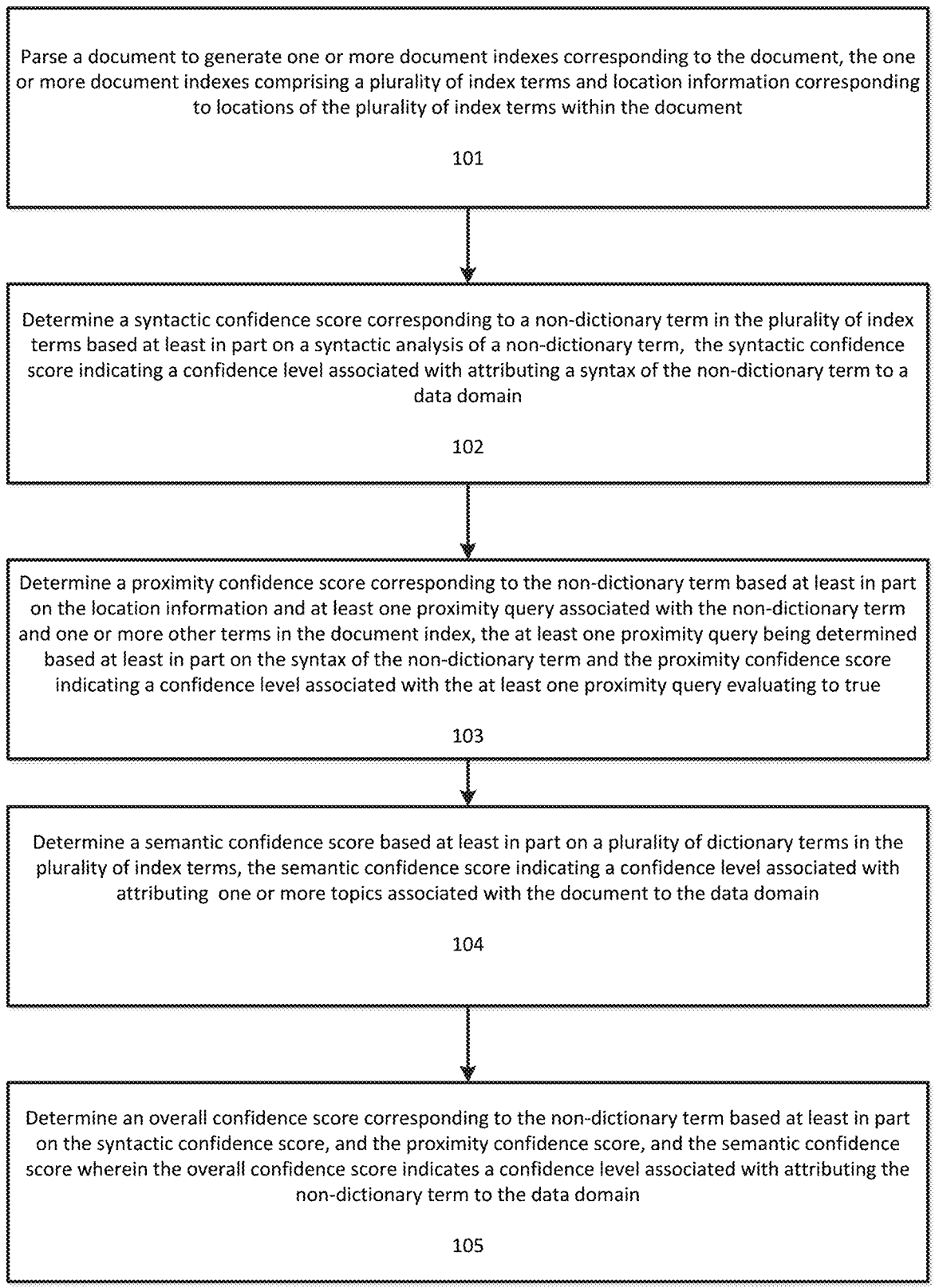
FIG. 1 illustrates a flowchart for determining a data domain associated with data according to an exemplary embodiment.

FIG. 1 illustrates a flowchart for determining a data domain associated with data according to an exemplary embodiment. At step 101 a document is parsed to generate one or more document indexes corresponding to the document. As used herein, a document can include any type of document, such as a text document, a spreadsheet, a power point presentation, or any other type of structured or unstructured file. The documents can be input in a variety of formats such as, but not limited to, Microsoft Word, Microsoft Excel, Portable Document Format (PDF), rich text format, and many others. Also, there is no limitation on the language in which the documents are written. The document can also be a text corpus which itself is the result of the aggregation of multiple different files. The document can be received prior to the parsing step, such as from a computing device, a network device, an online source, local storage, or any other source.

The one or more document indexes include a plurality of index terms and location information corresponding to locations of the plurality of index terms within the document. As will be discussed further below, the plurality of index terms correspond to a plurality of unique words within the document.

Figure 2:
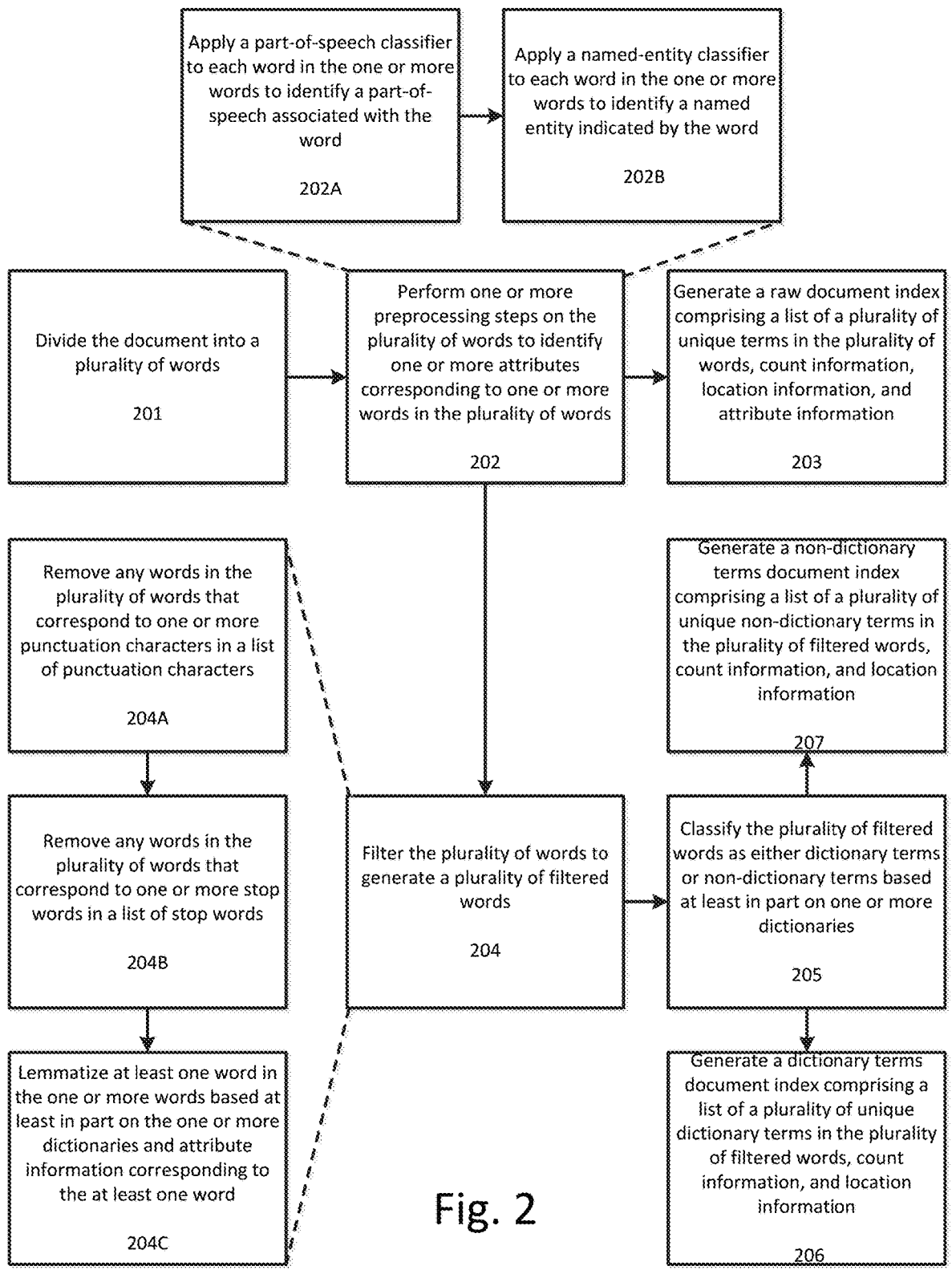
FIG. 2 illustrates a flowchart for parsing a document to generate one or more document indexes corresponding to the document according to an exemplary embodiment.

FIG. 2 illustrates a flowchart for parsing a document to generate one or more document indexes corresponding to the document according to an exemplary embodiment. At step 201 the document is divided into a plurality of words using a tokenization process. Each word is an atomic term in the document. This step can be performed, for example, by detecting delimiters between terms in the document. For example, the dividing step can include recognizing all spaces and punctuation characters between textual content in the document to identify the plurality of words. For example, the text "Friday—the last day of the work week" would be divided using spaces and punctuation characters so that the plurality of words would include {Friday, -, the, last, day, of, the, work, week}.

At step 202 one or more preprocessing steps are performed on the plurality of words to identify one or more attributes corresponding to one or more words in the plurality of words. Attributes of words can include, for example, a part-of-speech associated with the word, a named entity associated with the word, a part-of-speech tag associated with a word (such as a Penn Treebank tag), a length of the word, a characteristic of the word (such as whether it is a number or a character string), or any other attribute associated with a word.

Step 202 can include one or both of steps 202A and 202B. At step 202A one or more part-of-speech classifiers are applied to each word in the one or more words to identify a part-of-speech associated with the word. The part-of-speech classifiers identify inflected word forms and, as discussed further below, can be used to map inflected words to lemmas (the prime dictionary forms of the inflected words).

At step 202B one or more named entity classifiers can be applied to each word in the one or more words to identify a named entity indicated by the word. The named entity classifiers identify terms which represent personal names, organizations names, geographical location names and specialized data objects such as telephone numbers, common identification numbers, etc. The named entity classifiers can include domain specific named entity classifiers, such as named entity classifiers pertaining to a security domain or a personal information domain.

At step 203 a raw document index is generated based at least in part on the plurality of words, the one or more preprocessing steps, and/or information derived from the document. The raw document index includes plurality of unique terms in the plurality of words, count information corresponding to number of occurrences of each unique term in the document, and location information corresponding to one or more locations of each unique term in the document. The raw document index can also include attribute information corresponding to one or more attributes of one or more unique terms in the plurality of unique terms, such as a part-of-speech associated with a unique term or a named entity recognized for the unique term.

FIGS. 3A-3B illustrate an example of a document and a portion of a raw index generated from the document according to an exemplary embodiment. As shown in FIG. 3A, the document 301 is a purchase order and includes information about the purchaser, the vendor, and the items being purchased.

FIG. 3B illustrates a portion of the raw document index 302 generated from document 301 in FIG. 3A. As shown by magnified entry 303, each entry in the raw document index includes a count 303A corresponding to a number of occurrences of a unique term in the plurality of words. Entry 303 also includes a part of speech attribute 303B associated with the unique term. The part-of-speech can be determined according to any type of appropriate classifier. As shown in FIG. 3B, the part-of-speech 303B is identified according to Penn-Treebank part-of-speech tags, the abbreviations of which are listed below, along with the corresponding part-of-speech identified:

CC—Coordinating conjunction
CD—Cardinal number
DT—Determiner
EX—Existential there
FW—Foreign word
IN—Preposition or subordinating conjunction
JJ—Adjective
JJR—Adjective, comparative
JJS—Adjective, superlative
LS—List item marker
MD—Modal
NN—Noun, singular or mass
NNS—Noun, plural
NNP—Proper noun, singular
NNPS—Proper noun, plural
PDT—Predeterminer
POS—Possessive ending
PRP—Personal pronoun
PRP$—Possessive pronoun
RB—Adverb
RBR—Adverb, comparative
RBS—Adverb, superlative
RP—Particle
SYM—Symbol
TO—to
UH—Interjection
VB—Verb, base form
VBD—Verb, past tense
VBG—Verb, gerund or present participle
VBN—Verb, past participle
VBP—Verb, non-3rd person singular present
VBZ—Verb, 3rd person singular present
WDT—Wh-determiner
WP—Wh-pronoun
WP$—Possessive wh-pronoun (prolog version WP-S)
WRB—Wh-adverb As shown above, the part-of-speech attribute 303B associated with entry 303 indicates that it is proper noun, singular.

Entry 303 also includes a named entity attribute 303C which is the result of recognition by the one or more named entity classifiers. In this case, the named entity attribute 303C indicates that the unique term corresponds to the name of an organization. Other named entities can include, for example, numbers, locations and/or persons.

Each of the entries in the raw document index 302 also includes the actual text of the corresponding unique term. For example, entry 303 includes the text "Informatica" 303D which is the unique term identified in the plurality of words.

Returning to FIG. 2, at step 204 the plurality of words are filtered to generate a plurality of filtered words. Step 204 can include one or more of steps 204A, 204B, and 204C.

At step 204A any words in the plurality of words that correspond to one or more punctuation characters in a list of punctuation characters are removed. This can include, for example, removing words which are single character punctuation such as commas, periods, apostrophes, colons, semicolons, etc. This can also include removing multi-character punctuation such as ellipses. A predetermined list of punctuation characters can be stored, retrieved, and compared with each of the plurality of words to identify any words corresponding to one or more punctuation characters. For example, the punctuation list can include the terms: {; : , . ! ? ( )[ ]- * &}.

At step 204B any words in the plurality of words that correspond to one or more stop words in a list of stop words are removed. This can include, for example, removing common words such as prepositions, definite article, indefinite articles, conjunctions, etc. For example, the stop words list can include the words {and, or, but, so, the, a, an, to}.

At step 204C at least one word in the one or more words is lemmatized based at least in part on the one or more dictionaries and attribute information corresponding to the at least one word. This can include looking up the word in one of the dictionaries to determine the prime or base form of the word and mapping the word to the prime form (replacing the non-prime form with the prime form). For example, the word "bargaining" can be replaced with the word "bargain." Lemmatization removes inflectional endings and returns the base or dictionary form of a word, known as the lemma. As an alternative to lemmatization, a stemmer can be utilized which removes the stem of the word.

At step 205 the plurality of filtered words the plurality of filtered words are classified as either dictionary terms or non-dictionary terms based at least in part on one or more dictionaries. This step can include comparing each filtered word to words in the one or more dictionaries. If a match is found, then the filtered word is classified as a dictionary word. If a match is not found, then the filtered word is classified as a non-dictionary word.

At step 206 a dictionary terms document index is generated based at least in part on the dictionary terms in the plurality of filtered words and information derived from the document. The dictionary terms document index includes a list of a plurality of unique dictionary terms in the plurality of filtered words, count information corresponding to number of occurrences of each unique dictionary term, and location information corresponding to one or more locations associated with each unique dictionary term in the document. The dictionary terms document index can also include attribute information corresponding to the plurality of unique dictionary terms.

FIG. 3C illustrates an example of a portion of a dictionary terms document index 304 generated from document 301 in FIG. 3A. As shown in FIG. 3C, none of the entries in the dictionary terms document index has an attribute corresponding to a recognized named entity, indicating that none of the unique dictionary terms corresponds to any recognized named entity.

Returning to FIG. 2, at step 207 a non-dictionary terms document index is generated based at least in part on the non-dictionary terms in the plurality of filtered words and information derived from the document. The non-dictionary terms document index includes a plurality of unique non-dictionary terms in the plurality of filtered words, count information corresponding to number of occurrences of each unique non-dictionary term, and location information corresponding to one or more locations associated with each unique non-dictionary term in the document. The non-dictionary terms document index can also include attribute information corresponding to the plurality of unique non-dictionary terms. The non-dictionary terms document index will include all unique terms in the plurality of filtered words that were not matched to any terms in the one or more dictionaries. Typically, the non-dictionary terms are the terms for which a data domain needs to be identified, as they will include sensitive data objects such as social security numbers, telephone numbers, passwords, and/or credit card information.

FIG. 3D illustrates an example of a portion of a non-dictionary terms document index 304 generated from document 301 in FIG. 3A. As shown in FIG. 3D, the non-dictionary terms document index 304 includes several unique non-dictionary terms that have been recognized as named entities, such as locations, people, and organizations.

Steps 203, 206, and 207 in FIG. 2 can optionally be performed by a document indexing module responsible for generating the raw document index, the dictionary terms document index, and the non-dictionary terms document index. Additionally, steps 201, 202, 204, and 205 can optionally be performed by a document preprocessing module that is responsible for parsing the document and performing the initial preprocessing steps.

Returning to FIG. 1, at step 102 a syntactic confidence score corresponding to a non-dictionary term in the plurality of index terms is determined based at least in part on a syntactic analysis of the non-dictionary term. The non-dictionary term can correspond to the data object for which a data domain is unknown and is to be determined. For example, the non-dictionary term can correspond to a number which could potentially be a sensitive number such as a social security number or a telephone number. The syntactic confidence score indicates a confidence level associated with attributing a syntax of the non-dictionary term to a data domain, such as a sensitive data domain. As used herein, a data domain can refer to an object type, an object classification, an object class, and/or a domain of data values.

Figure 4:
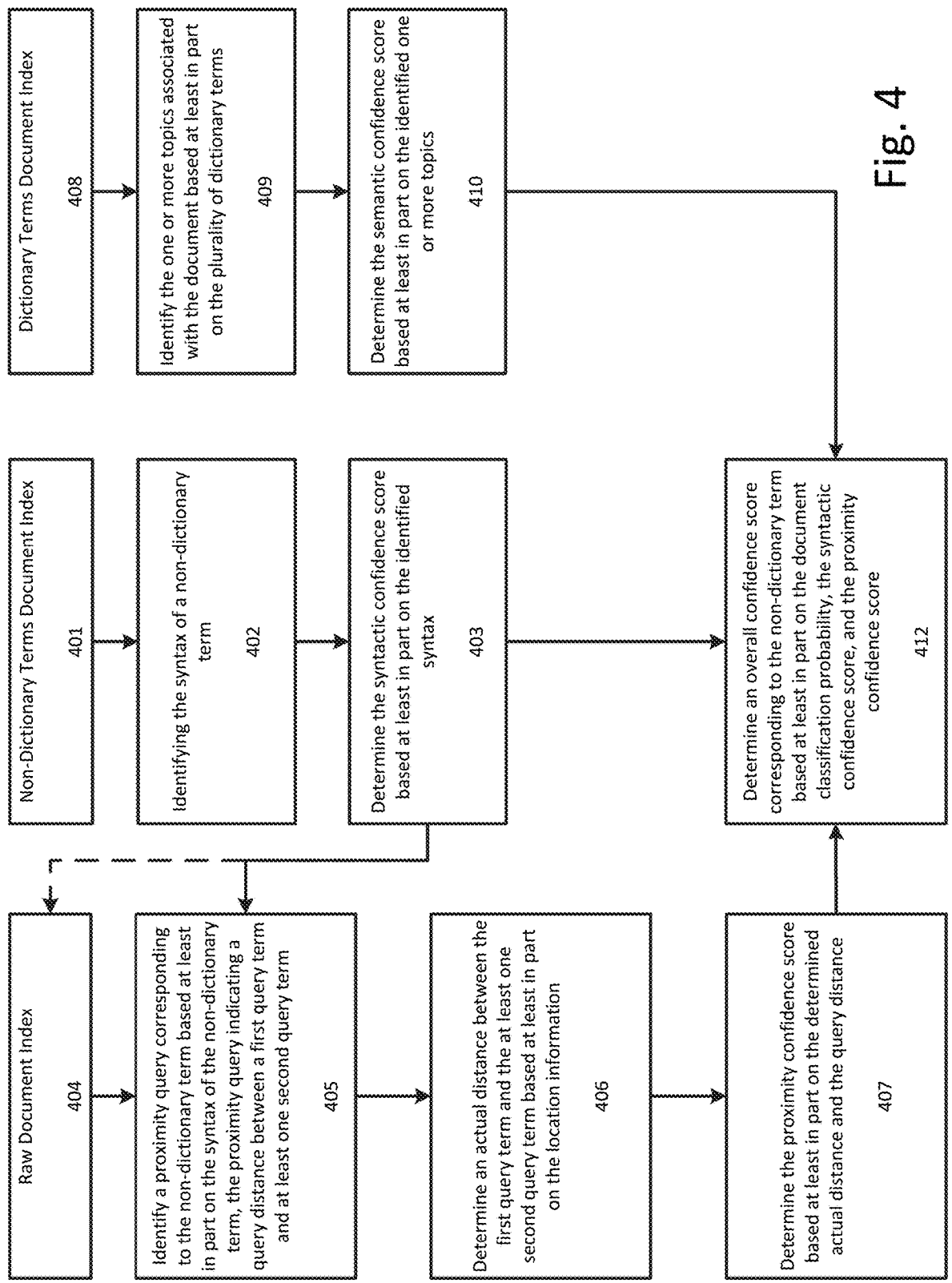
FIG. 4 illustrates a process flow for determining a data domain of a non-dictionary term using the raw document index, the non-dictionary terms document index, and the dictionary terms document index according to an exemplary embodiment.

FIG. 4 illustrates a process flow for determining a data domain of a non-dictionary term using the raw document index, the non-dictionary terms document index, and the dictionary terms document index. Steps 402-403 of FIG. 4 can be used to determine a syntactic confidence score corresponding to a non-dictionary term in the plurality of index terms based at least in part on a syntactic analysis of the non-dictionary term.

At step 402 a syntax of a non-dictionary term in the non-dictionary terms document index 401 is identified. The syntax of the non-dictionary term can be determined in a variety of ways. For example, the syntax can be determined using regular expression based pattern matching of the non-dictionary term, lookup of the non-dictionary term in a table of identified syntaxes, and/or probabilistic matching of the non-dictionary term to one of a plurality of syntaxes. For example, the regular expression ^\d{3}-\d{2}-\d{4}$ can be used to match to social security numbers in the format NNN-NN-NNNN, where in N is a single digit number. Alternatively or additionally, a non-dictionary term can be looked up in table, such as a table of all phone numbers for a particular area, to potentially find a match, in which case the syntax would be identified as a phone number.

At step 403 a syntactic confidence score is determined based at least in part on the identified syntax. As discussed above, this syntactic confidence score indicates a confidence level associated with attributing a syntax of the non-dictionary term to a data domain. The syntactic confidence score, Pr(Syn), can be computed by a Bayesian inference module. The inference of associating the syntax of the non-dictionary term to a data domain can be performed by the Bayesian inference module based on empirical and computed probabilities. Of course, methods other than Bayesian inference can be used for deriving probabilistic results. For example, a Deep-Learning Artificial Neural Network can be used for same purpose.

As shown in FIG. 4, the output of the syntactic confidence score determination step 403 can be used to augment the Raw Document Index 404 with named entities corresponding to data domains (object classes) identified based on syntactical analysis along with the assurance level of said named entity identification. The assurance level can correspond to a probability that said named entity has been classified correctly by a syntactic analyzer performing step 403.

Returning to FIG. 1, at step 103 a proximity confidence score corresponding to the non-dictionary term is determined based at least in part on the location information and at least one proximity query that is associated with the non-dictionary term and one or more other terms in the document index. The at least one proximity query is determined based at least in part on the syntax of the non-dictionary term because the syntax of the non-dictionary term is used by syntactic analyzer (along with additional information such as contextual information) to identify a data domain of the non-dictionary term and/or a named entity and this syntactically identified data domain and/or named entity is in turn used to determine the at least one proximity query. As discussed in greater detail below, the proximity confidence score indicates a confidence level associated with the at least one proximity query evaluating to true.

Steps 405-407 of FIG. 4 can be used to determine a proximity confidence score corresponding to the non-dictionary term based at least in part on the location information and at least one proximity query that includes the non-dictionary term and one or more other terms in the document index.

At step 405 at least one proximity query corresponding to the non-dictionary term is determined based at least in part on the syntax of the non-dictionary term. As shown in FIG. 4, step 405 receives input from the raw document index 404, which can be augmented with the output from the syntactic confidence score determination step 403. Regardless of whether the raw document index 404 is augmented, it will include attribute information corresponding to one or more index terms contained therein, including recognized named entity attributes. The recognized named entities in the document can be used in addition to named entities identified as a result of a data domain identified by the syntactic analysis of the non-dictionary term to determine the at least one proximity query, as is discussed in greater detail with respect to FIG. 6.

Step 405 can be performed by a terms proximity analyzer which can scan the raw document index for named entities discovered in the document during named entity recognition. The syntactically identified data domain of the non-dictionary term can be provided, optionally with the recognized named entities, to a proximity queries repository. The proximity queries repository then returns the at least one query corresponding to the syntactically identified data domain and, optionally, corresponding to the recognized named entities.

The proximity queries stored in the semantic proximity queries repository can be configured manually by an operator or can be automatically generated based on a collection of policies or a trainable mechanism such as a Bayesian network or an artificial neural network.

Each proximity query can include a query distance (N) between a first query term corresponding to the non-dictionary term and at least one second query terms corresponding to at least one of the one or more other terms in the document index. This query distance indicates a distance condition associated with the proximity query. For example, if the proximity query specifies that two terms must be within 5 words of each other, then the query distance is "5." As discussed below, the first query term corresponding to the non-dictionary term and/or the at least one second query term can be represented in the query using one or more of the actual text of the corresponding terms, a named entity classification associated with the corresponding term, a syntactically identified domain for the corresponding term, or any other attribute associated with the corresponding term.

The terms proximity analyzer can operate on literal and logical expressions combined by proximity or logical operators. Proximity operators utilized by the terms proximity analyzer include unordered proximity ("NEAR"), ordered proximity ("PRECEDES"), proximity negation ("NOT-WITHIN") and Boolean logic operators AND, OR and NOT. Each of the proximity operators can be parameterized to indicate proximity in terms of a maximal number of words (the query distance)—a positive number greater than 0—between the operands. For example, the expression "A NEAR/5 B" evaluates to "true" if terms A and B are within five words of each other.

The Boolean logic operators have a scope of the whole document. For example, the expression "A OR B" evaluates to "true" if one or both terms A and B are present in the document.

Proximity evaluation operations may be combined using standard Boolean logic operators AND, OR and NOT. Semantics (proximity vs. logical combination) of a particular Boolean logical operator is determined from the context in which the operation is executed. For example, the expression "(A PRECEDES B) AND (B AND C)" first evaluates the leftmost AND operator in the context of operands' proximity and then in the context of a Boolean logic operation.

The operands of the proximity operators can either be actual words or phrases or named semantical categories or a combination of both. For example, if personal names have been identified by named entity classifiers and a syntactically identified data domain indicating a telephone number has been identified by the syntactic analyzer, then a semantic proximity query like "<FullName>NEAR/4<TelephoneNumber>" can be used as the proximity query to identify whether the document contains potentially sensitive personal telephone information. In this example, the term <FullName> corresponds to a named entity attribute and the term <TelephoneNumber> also corresponds to a named entity. In this case, the named entity <Telephone Number> is determined based upon the syntactically identified data domain of the non-dictionary term. Another example of a proximity query can be "'home' PRECEDES/3 <TelephoneNumber>" in which the word "home" is paired with the term <Telephone Number> corresponding to a named entity determined based on a syntactically identified data domain of the non-dictionary term.

At step 406 an actual distance (w) between the first query term and the at least one second query term is determined based at least in part on the location information. As discussed earlier, the location information can be part of the raw document index and can include one or more positions of each of the unique terms in the document.

At step 407 a proximity confidence score is determined based at least in part on the determined actual distance and the query distance. The proximity confidence score is given by Pr(Prox|Syn), denoting a conditional probability which is dependent on the correct syntactical identification of the data domain (object class) of the non-dictionary term, which itself is based at least in part on the syntax of the non-dictionary term (as well as additional information such as contextual information). This probability is conditional since the proximity queries that are identified are dependent on the identified data domain (object class).

The proximity confidence score can be calculated as:

$$\Pr(\text{Prox} \mid Syn) = \begin{cases} 1 - \dfrac{w-1}{N}, & 0 < w \le N \\ 0, & w > N \end{cases}$$

Where w corresponds to the actual distance between the query terms and N corresponds to the query distance specified in the query. As shown above, when the actual distance is greater than the query distance, the proximity confidence score is zero.

The proximity confidence score can be interpreted as a probability of a successful proximity query conditioned on the syntactically identified data domain of the non-dictionary term. The syntactically identified data domain is in turn dependent on the syntax identified corresponding to the non-dictionary term in step 402. In other words, the proximity confidence score indicates a confidence level associated with the at least one proximity query, which is determined based at least in part on the syntactically identified data domain, evaluating to true.

The results of proximity analysis obtained by the terms proximity analyzer can be used for redaction or protection of restricted access data in the document. This can be performed by retaining absolute positions of the terms in the raw document index 404. Based on positional information in the raw document index 404 and upon a determination that one or more non-dictionary terms can be attributed to a sensitive data domain (at or beyond a predetermined overall confidence score threshold), a dedicated security module can be used to mask, encrypt, hash, or otherwise obfuscate the one or more non-dictionary terms in the document.

Figure 5:
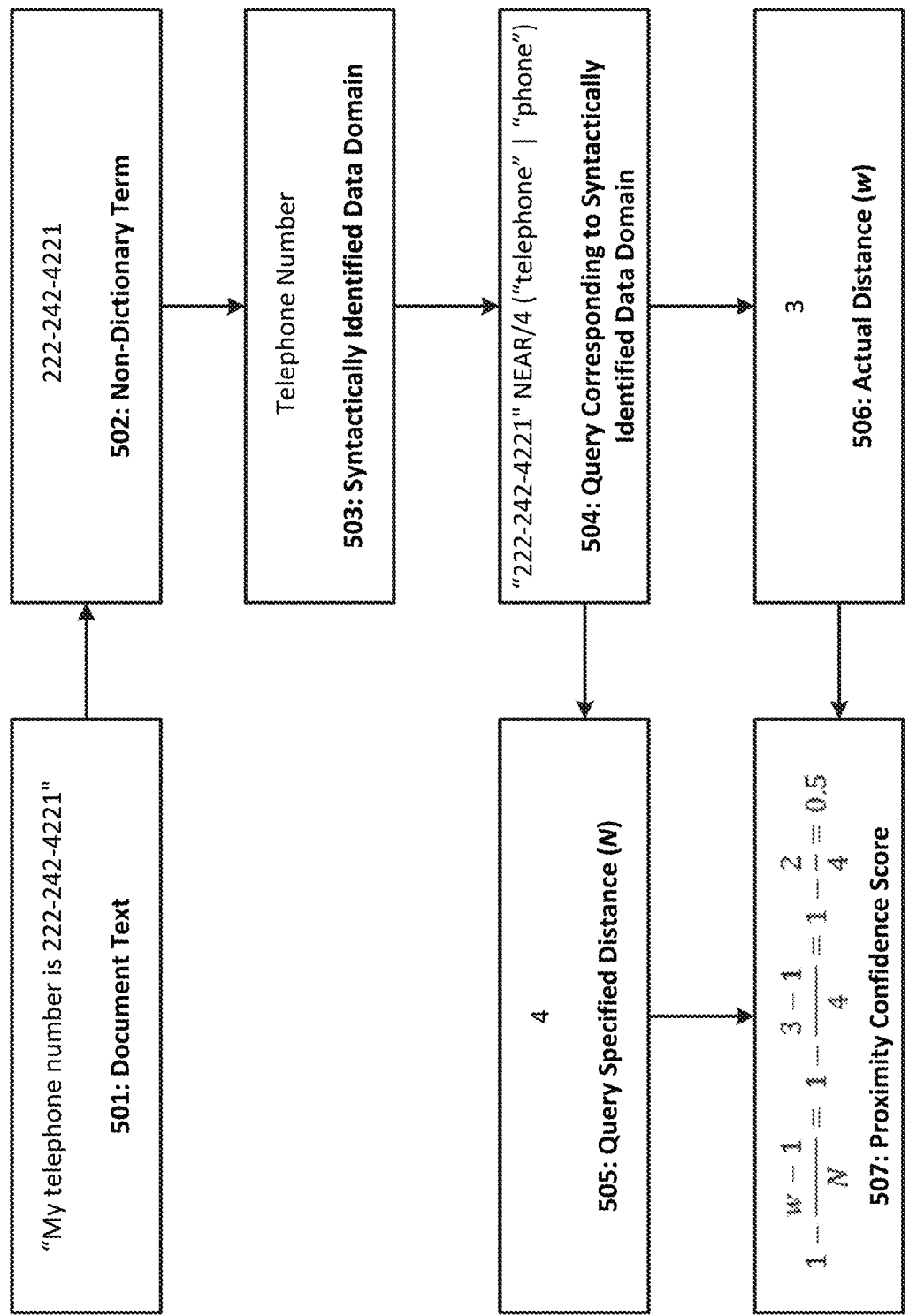
FIG. 5 illustrates an example of proximity confidence score determination according to an exemplary embodiment.

FIG. 5 illustrates an example of proximity confidence score determination according to an exemplary embodiment. As shown in box 501, the document includes the text "My telephone number is 222-242-4221." After preprocessing and indexing, a non-dictionary term of "222-242-4221" is selected for data domain determination, as indicated in box 502. Of course, more than one non-dictionary term from the non-dictionary index can be selected for data domain determination and the process shown in FIGS. 1-4 can be repeated for each non-dictionary term. As shown in box 503, the syntactic analysis of the non-dictionary term results in a syntactically identified data domain of "Telephone Number." This syntactic identification can be based, for example, on the non-dictionary term matching the regular expression ^\d{3}-\d{3}-\d{4}$. The syntactically identified data domain is then used to query a proximity query repository, resulting in the selection of the proximity query shown in box 504. As shown in box 505, the query specified distance of the query shown in box 505 is "4," since the query specifies "NEAR/4." Using the location information, either in the raw document index or by referring to the original document, an actual distance between the terms in the query can also be calculated. As shown in box 506, this actual distance is calculated as "3," since the word "telephone" is three words from the word "222-242-4221." The proximity confidence score corresponding to the non-dictionary term is then calculated according to the formula discussed above, resulting in a proximity confidence score of 0.5, as shown in box 507.

Figure 6:
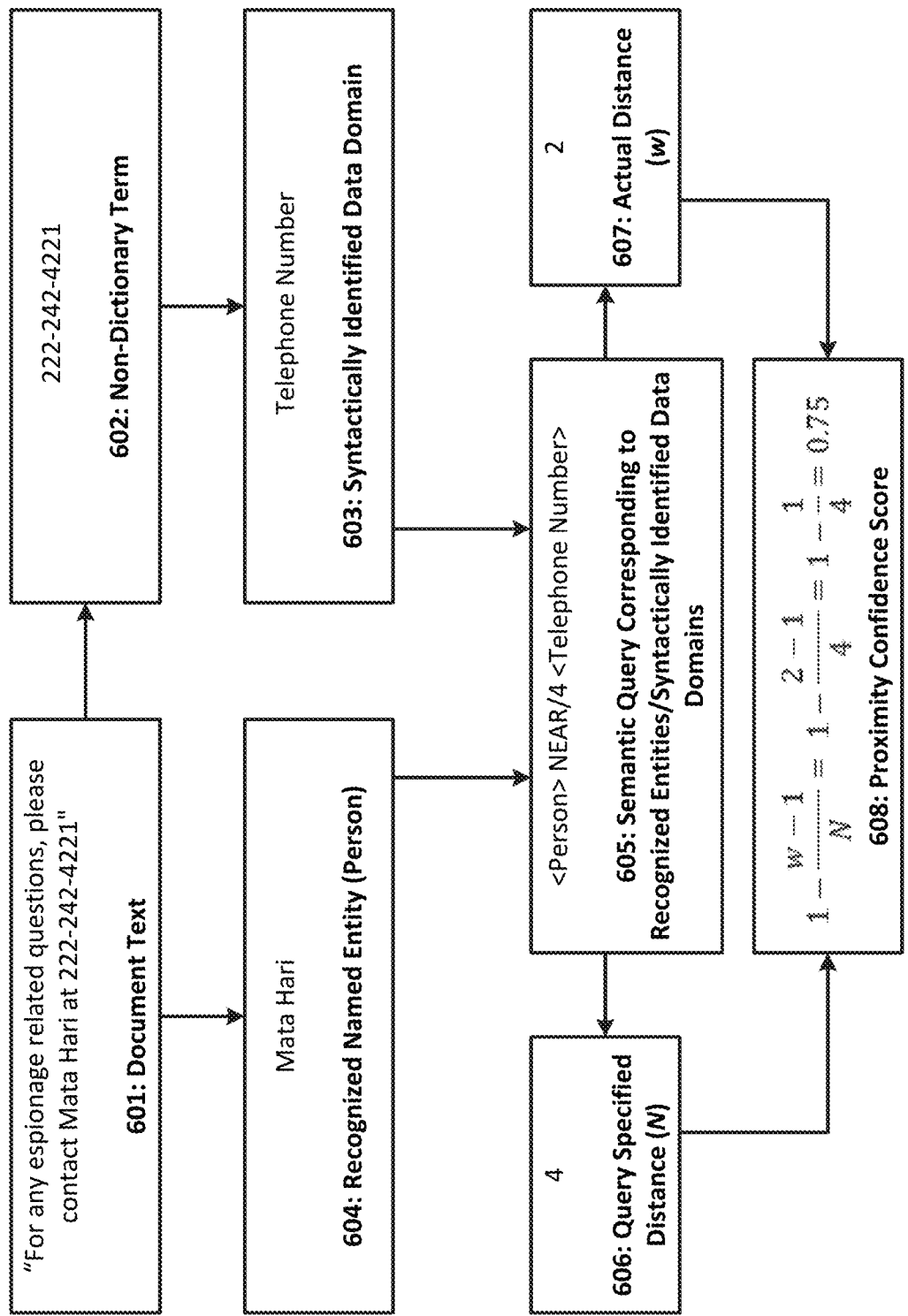
FIG. 6 illustrates another example of proximity confidence score determination in which a recognized entity is also used to retrieve a proximity query according to an exemplary embodiment.

The proximity query retrieval process can utilize information other than just the syntactically identified data domain for the non-dictionary term. FIG. 6 illustrates another example of proximity confidence score determination in which a recognized entity is also used to retrieve a proximity query according to an exemplary embodiment. As shown in box 601, the document includes the text "For any espionage related questions, please contact Mata Hari at 222-242-4221." After preprocessing and indexing, a non-dictionary term of "222-242-4221" is selected for data domain determination, as indicated in box 602. Of course, more than one non-dictionary term from the non-dictionary index can be selected for data domain determination and the process shown in FIGS. 1-4 can be repeated for each non-dictionary term. As shown in box 603, the syntactic analysis of the non-dictionary term results in an identified data domain (object class) of "Telephone Number." This syntactic identification can be based, for example, on the non-dictionary term matching the regular expression ^\d{3}-\d{3}-\d{4}$. Additionally, based upon the named entity classifiers applied to the words of the document another term, "Mata Hari" is recognized as corresponding to a "Person" entity, as shown in box 604.

The syntactically identified data domain and the recognized entity are then used to query a proximity query repository, resulting in the selection of the proximity query shown in box 605. Unlike the proximity query shown FIG. 5, this proximity query utilizes two semantic categories, <Person> (the second query term corresponding to one or more other words in the document index) and <Telephone Number> (the first query term corresponding to the non-dictionary term), rather than actual words or phrases.

As shown in box 606, the query specified distance of the query shown in box 605 is "4," since the query specifies "NEAR/4." Using the location information in the raw document index along with attribute information corresponding to the index terms, a semantic match is found for the semantic categories and an actual distance between the terms corresponding to the semantic categories in the query can also be calculated. As shown in box 607, this actual distance is calculated as "2," since a term having the attribute <Telephone Number> (the word "222-242-4221") is two words from a term having the attribute <Person> (the word "Mata Hari"). The proximity confidence score corresponding to the non-dictionary term is then calculated according to the formula discussed above, resulting in a proximity confidence score of 0.75, as shown in box 608.

FIGS. 5-6 pertain to examples where a single proximity query is retrieved for a given syntactically identified data domain and, optionally, a recognized entity. Of course, more than one proximity query can also be retrieved and executed on the raw document index. In this case, a proximity confidence score can be determined for each proximity score. The proximity confidence scores can then be aggregated, such through a mean or some other statistical measure, to generate a final proximity confidence score.

Returning to FIG. 1, at step 104 a semantic confidence score is determined based at least in part on a plurality of dictionary terms in the plurality of index terms. The semantic confidence score indicates a confidence level associated with attributing one or more topics associated with the document to the data domain Steps 409-410 of FIG. 4 can be used to determine a semantic confidence score based at least in part on a plurality of dictionary terms in the plurality of index terms according to an exemplary embodiment.

At step 409 the one or more topics associated with the document are identified based at least in part on the plurality of dictionary terms in the dictionary terms document index 408. This process is shown in FIG. 7, which illustrates a flowchart for identifying one or more topics associated with the document according to an exemplary embodiment.

At step 701 a reduced document term matrix is generated by performing singular value decomposition on a document term matrix corresponding to a plurality of documents. The plurality of documents are associated with a plurality of topics, with each document being associated with one or more topics in the plurality of topics. The reduced document term matrix itself comprises a plurality of document columns corresponding to the plurality of documents and a plurality of term rows corresponding to a plurality of terms within the plurality of documents.

The original document term matrix can be generated by a semantic analysis module. The semantic analysis module uses a model process to construct a document corpora comprised of the plurality of documents covering a plurality of topics. For example, when considering a business environment, documents covering topics such as, but not limited to, "Purchase Order", "Invoice", "Bill of Laden", "Job Application", "Receipt" are included in the document corpora. During a model training process, the dictionary terms index can be used for creating the Document Term Matrix (DTM). During the topical classification process, the dictionary terms index is used as input into Latent Semantic Indexing (LSI) document classifier component and is compared with topical information residing in the DTM with the objective of identifying one or more document topics, as discussed below.

Once a representative document corpora is created it becomes a basis for associating previously unseen documents with one or more topics represented in the document corpora with a certain degree of assurance. Prior to performing topical classification of previously unseen documents, the DTM is constructed and its dimensionality is reduced by performing Singular Value Decomposition (SVD) procedure followed by analysis of the computed eigenvalues of said DTM.

Reducing the number of dimensions in the data achieves speed up of subsequent similarity computation steps by reducing the number of dimensions as compared to the number dimensions in the original universe of discourse. The SVD procedure transforms data coordinates of the DTM in such a way that eigenvectors of the covariance matrix become a new coordinate axis.

At step 702 a dictionary terms index corresponding to the plurality of dictionary terms 700 is merged with the reduced document term matrix. The dictionary terms index is merged with the reduced document term matrix by the means of a Latent Semantic Indexing (LSI) procedure.

At step 703 a document vector corresponding to the document is determined based at least in part on one or more terms corresponding to the document in the reduced document term matrix. This document vector is derived from the results of the SVD transformation.

At step 704 one or more degrees of similarity are computed between the document vector and one or more reference document vectors corresponding to one or more other documents in the reduced document term matrix. This degree of similarity can be a cosine similarity between the document vectors or can be computed using other similarity metrics, such as the SimRank method.

At step 705 the one or more topics associated with the document are identified based at least in part on the computed one or more degrees of similarity and one or more of the plurality of topics associated with the plurality of documents. This step can include determining a degree of similarity of the document vector to all document vectors present in the reduced DTM and identifying one or more topics associated with a predetermined number of other documents having the highest similarity measures.

The result set of matching topics can also be selected as a union of a topic of a document with the highest similarity score and a topic of the documents with the highest representation in the top five matching results. In a case when more than one topic has equal representation among matching results a random choice can be made. A variety of top matching results can be considered and different result selection criteria can be used. For example, document metadata, such as document file type or a file name, related to a document in question can be used to influence topic selection decision. Additionally, a different indexing and retrieval method, such as semantic hashing or Latent Dirichlet Allocation, can be used to achieve the topical classification.

Returning to FIG. 4, at step 410, the semantic confidence score is determined based at least in part on the identified one or more topics. The semantic confidence score can be determined based on Bayesian inference and can indicate a confidence level associated with attributing one or more topics associated with the document to the data domain.

Returning to FIG. 1, at step 105 an overall confidence score corresponding to the non-dictionary term is determined based at least in part on the syntactic confidence score, the proximity confidence score, and the semantic confidence score. The overall confidence score indicates a confidence level associated with attributing the non-dictionary term to the data domain.

As shown in step 412 of FIG. 4, this step takes as input the syntactic confidence score, the proximity confidence score, and the semantic confidence score. For example, a Bayesian inference module can receive results of the analysis performed by a document semantic classifier, a syntactic analyzer, and a terms proximity analyzer and forward the results to Bayesian network nodes.

The Bayesian network can calculate the following joint probability function expressing a belief that a data object d (the non-dictionary term) is a member of a data domain (a class of data objects) D:

$$Pr(d \in D) = E(d \in D) Pr(Syn) Pr(Prox|Syn) Pr(Sem)$$

$Pr(d \in D)$—Overall confidence score—posterior probability that data object d is a member of a data domain D. This indicates an overall confidence level associated with attributing the non-dictionary term to the data domain.

$E(d \in D)$—Prior confidence score—informative prior probability that data object d is a member of a data domain D. The informative prior probability value is derived from historical experience locating members of a data domain D in the documents having a topic that is the same as a topic of the document. The prior confidence score is based at least in part on historical data corresponding to locating members of the data domain in documents associated with the one or more topics.

$Pr(Syn)$—syntactic confidence score—probability (confidence score) of the data object's d syntactical attribution to a data domain D. This confidence score value is provided by the syntactic analyzer and indicates a confidence level associated with attributing a syntax of the non-dictionary term to a data domain.

$Pr(Prox|Syn)$—proximity confidence score—this is a conditional probability given the syntactically identified data domain for the data object. The proximity confidence score indicates a confidence level associated with at least one proximity query evaluating to true.

Pr(Sem)—semantic confidence score—the probability of a document attribution to a topic. This probability is determined based on the results of semantic analysis provided by the LSI document classifier. The semantic confidence score indicates a confidence level associated with attributing one or more topics associated with the document to the data domain.

The joint probability function can alternatively use two or more of the above defined scores to compute the overall confidence score. For example, the overall confidence score can be calculated as the product of the syntactic confidence score and the semantic confidence score. Or the overall confidence score can be calculated as the product of the syntactic confidence score, proximity confidence score, and the semantic confidence score.

The system described herein can be implemented by one or more software modules. For example, the system can include a semantic analysis module, a syntactic analyzer module, a proximity analysis module, and a Bayesian inference module. Document preprocessing and document indexing components of the system can provide generic deconstruction and analysis functions of the input document. Information resulting from the document deconstruction can be provided to the semantic analysis module and the proximity analysis module in the form of a plurality of specialized inverted document indexes, as discussed above. Said specialized inverted indexes can serve as input during the semantic confidence score determination, the proximity confidence score determination, the syntactic confidence score determination, and the semantic model training processes.

The system disclosed here provides a significant advantage over the traditional data objects classification methods. Consider a scenario when the syntactical analysis module has determined that a data object is an instance of the US Social Security Number (SSN). In a traditional system, the outcome of a syntactic analysis is not scrutinized further which leads to many false positives. Indeed, a 9-digit number may represent a plurality of data types such as but not limited to a US SSN, an ABA Bank Routing number, a telephone number or other custom named data type instance. By applying proximity analysis and semantic (topical) classification, the present system can further prove or disprove whether a data object belongs to particular data domain. For example, if the proximity analysis determines that a person's name is situated in a document in proximity to a data object identified by the syntactic analysis module as a US SSN, the probability of said data object being a US SSN increases. If further conclusion of the semantic analysis of the topical classification component identifies said document's topic as "Job Application" then the data objects type classification assurance becomes almost certain. On the other hand, if the semantic analysis of the topical classification component identifies said document's topic as "Purchase Order" then colocation of a person's name with a 9-digit number in said document associates the data object in question with a telephone number.

Said inferences of associating data object properties and metrics (syntax, topic, proximity) with the data domain are performed by the Bayesian Inference module based on empirical and computed probabilities. It is appreciated that methods other than Bayesian inference may be used for deriving probabilistic results. For example, a Deep-Learning Artificial Neural Network may be used for same purpose.

Figure 8:
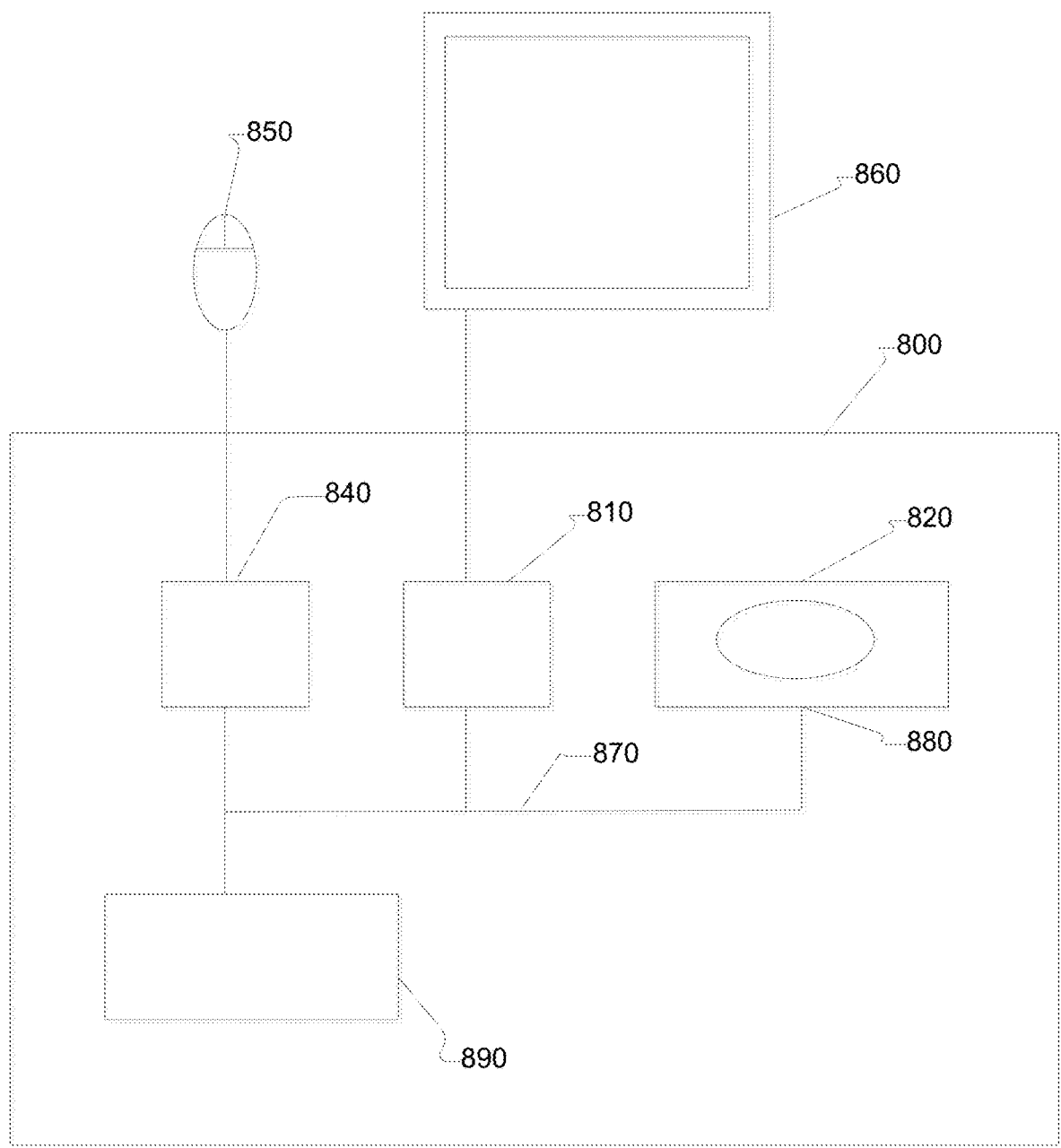
FIG. 8 illustrates an exemplary computing environment that can be used to carry out the method for determining a data domain associated with data.

One or more of the above-described techniques can be implemented in or involve one or more computer systems. FIG. 8 illustrates an example of a computing environment 1300. The computing environment 800 is not intended to suggest any limitation as to scope of use or functionality of a described embodiment(s).

With reference to FIG. 8, the computing environment 800 includes at least one processing unit 810 and memory 820. The processing unit 810 executes computer-executable instructions and can be a real or a virtual processor. In a multi-processing system, multiple processing units execute computer-executable instructions to increase processing power. The memory 820 can be volatile memory (e.g., registers, cache, RAM), non-volatile memory (e.g., ROM, EEPROM, flash memory, etc.), or some combination of the two. The memory 820 can store software 880 implementing described techniques.

A computing environment can have additional features. For example, the computing environment 800 includes storage 840, one or more input devices 850, one or more output devices 860, and one or more communication connections 890. An interconnection mechanism 870, such as a bus, controller, or network interconnects the components of the computing environment 800. Typically, operating system software or firmware (not shown) provides an operating environment for other software executing in the computing environment 800, and coordinates activities of the components of the computing environment 800.

The storage 840 can be removable or non-removable, and includes magnetic disks, magnetic tapes or cassettes, CD-ROMs, CD-RWs, DVDs, or any other medium which can be used to store information and which can be accessed within the computing environment 800. The storage 840 can store instructions for the software 880.

The input device(s) 850 can be a touch input device such as a keyboard, mouse, pen, trackball, touch screen, or game controller, a voice input device, a scanning device, a digital camera, remote control, or another device that provides input to the computing environment 800. The output device(s) 860 can be a display, television, monitor, printer, speaker, or another device that provides output from the computing environment 800.

The communication connection(s) 890 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 800, computer-readable media include memory 820, storage 840, communication media, and combinations of any of the above.

Of course, FIG. 8 illustrates computing environment 800, display device 860, and input device 850 as separate devices for ease of identification only. Computing environment 800, display device 860, and input device 850 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 800 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

I claim:

1. A method executed by one or more computing devices of a data domain classifier for classifying an unknown data object in an unstructured document, the method comprising:
    parsing the unstructured document to generate one or more document indexes corresponding to the unstructured document, the one or more document indexes comprising a plurality of index terms and location information corresponding to locations of the plurality of index terms within the unstructured document;
    determining a syntactic confidence score corresponding to an unknown data object in the plurality of index terms based at least in part on a syntactic analysis of the unknown data object, wherein the unknown data object comprises a term having an unknown data domain and wherein the syntactic confidence score indicates a confidence level associated with attributing a syntax of the unknown data object term to a data domain;
    determining a proximity confidence score corresponding to the unknown data object based at least in part on the location information and at least one proximity query associated with the unknown data object and one or more other terms in the document index, the at least one proximity query being determined based at least in part on the syntax of the unknown data object, wherein the proximity confidence score indicates a confidence level associated with the at least one proximity query evaluating to true; and
    classifying the unknown data object as an object in the data domain based at least in part on the syntactic confidence score and the proximity confidence score.

2. The method of claim 1, wherein the data domain comprises a sensitive data domain, and further comprising:
    applying one or more security protections to at least a portion of the unstructured document.

3. The method of claim 2, wherein applying one or more security protections to at least a portion of the unstructured document comprises:
    applying data masking to instances of the unknown data object within the unstructured document.

4. The method of claim 2, wherein applying one or more security protections to at least a portion of the unstructured document comprises:
    encrypting the unstructured document.

5. The method of claim 1, wherein determining a syntactic confidence score corresponding to an unknown data object in the plurality of index terms based at least in part on a syntactic analysis of the unknown data object comprises:
    identifying the syntax of the unknown data object based on one or more of: regular expression based pattern matching of the unknown data object, lookup of the unknown data object in a table of identified syntaxes, or probabilistic matching of the unknown data object to one of a plurality of syntaxes; and
    determining the syntactic confidence score based at least in part on the identified syntax.

6. The method of claim 1, wherein determining a proximity confidence score corresponding to the unknown data object based at least in part on the location information and at least one proximity query associated with the unknown data object and one or more other terms in the document index comprises:
    identifying the at least one proximity query corresponding to the unknown data object based at least in part on the syntax of the unknown data object, the at least one proximity query indicating a query distance between a first query term corresponding to the unknown data object and at least one second query term corresponding to at least one of the one or more other terms;
    determining an actual distance between the first query term and the at least one second query term based at least in part on the location information; and
    determining the proximity confidence score based at least in part on the determined actual distance and the query distance.

7. The method of claim 1, further comprising:
    determining a semantic confidence score based at least in part on a plurality of dictionary terms in the plurality of index terms, wherein the semantic confidence score indicates a confidence level associated with attributing one or more topics associated with the unstructured document to the data domain;
    wherein classifying the unknown data object as an object in the data domain further comprises classifying the unknown data object as an object in the data domain based at least in part on the syntactic confidence score, the proximity confidence score, and the semantic confidence score.

8. A data domain classifier apparatus for classifying an unknown data object in an unstructured document, the data domain classifier apparatus comprising:
    one or more processors; and
    one or more memories operatively coupled to at least one of the one or more processors and having instructions stored thereon that, when executed by at least one of the one or more processors, cause at least one of the one or more processors to:
        parsing the unstructured document to generate one or more document indexes corresponding to the unstructured document, the one or more document indexes comprising a plurality of index terms and location information corresponding to locations of the plurality of index terms within the unstructured document;
        determining a syntactic confidence score corresponding to an unknown data object in the plurality of index terms based at least in part on a syntactic analysis of the unknown data object, wherein the unknown data object comprises a term having an unknown data domain and wherein the syntactic confidence score indicates a confidence level associated with attributing a syntax of the unknown data object term to a data domain;
        determining a proximity confidence score corresponding to the unknown data object based at least in part on the location information and at least one proximity query associated with the unknown data object and one or more other terms in the document index, the at least one proximity query being determined based at least in part on the syntax of the unknown data object, wherein the proximity confidence score indicates a confidence level associated with the at least one proximity query evaluating to true; and classifying the unknown data object as an object in the data domain based at least in part on the syntactic confidence score and the proximity confidence score.

9. The data domain classifier apparatus of claim 8, wherein the data domain comprises a sensitive data domain and wherein at least one of the one or more memories has further instructions stored thereon that, when executed by at least one of the one or more processors, cause at least one of the one or more processors to:

apply one or more security protections to at least a portion of the unstructured document.

10. The data domain classifier apparatus of claim 9, wherein the instructions that, when executed by at least one of the one or more processors, cause at least one of the one or more processors to apply one or more security protections to at least a portion of the unstructured document further cause at least one of the one or more processors to:

apply data masking to instances of the unknown data object within the unstructured document.

11. The data domain classifier apparatus of claim 9, wherein the instructions that, when executed by at least one of the one or more processors, cause at least one of the one or more processors to apply one or more security protections to at least a portion of the unstructured document further cause at least one of the one or more processors to:

encrypt the unstructured document.

12. The data domain classifier apparatus of claim 8, wherein the instructions that, when executed by at least one of the one or more processors, cause at least one of the one or more processors to determine a syntactic confidence score corresponding to an unknown data object in the plurality of index terms based at least in part on a syntactic analysis of the unknown data object further cause at least one of the one or more processors to:

identify the syntax of the unknown data object based on one or more of: regular expression based pattern matching of the unknown data object, lookup of the unknown data object in a table of identified syntaxes, or probabilistic matching of the unknown data object to one of a plurality of syntaxes; and determine the syntactic confidence score based at least in part on the identified syntax.

13. The data domain classifier apparatus of claim 8, wherein the instructions that, when executed by at least one of the one or more processors, cause at least one of the one or more processors to determine a proximity confidence score corresponding to the unknown data object based at least in part on the location information and at least one proximity query associated with the unknown data object and one or more other terms in the document index further cause at least one of the one or more processors to:

identify the at least one proximity query corresponding to the unknown data object based at least in part on the syntax of the unknown data object, the at least one proximity query indicating a query distance between a first query term corresponding to the unknown data object and at least one second query term corresponding to at least one of the one or more other terms;

determine an actual distance between the first query term and the at least one second query term based at least in part on the location information; and determine the proximity confidence score based at least in part on the determined actual distance and the query distance.

14. The data domain classifier apparatus of claim 8, wherein at least one of the one or more memories has further instructions stored thereon that, when executed by at least one of the one or more processors, cause at least one of the one or more processors to:

determine a semantic confidence score based at least in part on a plurality of dictionary terms in the plurality of index terms, wherein the semantic confidence score indicates a confidence level associated with attributing one or more topics associated with the unstructured document to the data domain;

wherein the instructions that, when executed by at least one of the one or more processors, cause at least one of the one or more processors to classify the unknown data object as an object in the data domain further cause at least one of the one or more processors to classify the unknown data object as an object in the data domain based at least in part on the syntactic confidence score, the proximity confidence score, and the semantic confidence score.

15. At least one non-transitory computer-readable medium storing computer-readable instructions for classifying an unknown data object in an unstructured document that, when executed by one or more computing devices of a data domain classifier, cause at least one of the one or more computing devices to:

parse the unstructured document to generate one or more document indexes corresponding to the unstructured document, the one or more document indexes comprising a plurality of index terms and location information corresponding to locations of the plurality of index terms within the unstructured document;

determine a syntactic confidence score corresponding to an unknown data object in the plurality of index terms based at least in part on a syntactic analysis of the unknown data object, wherein the unknown data object comprises a term having an unknown data domain and wherein the syntactic confidence score indicates a confidence level associated with attributing a syntax of the unknown data object term to a data domain;

determine a proximity confidence score corresponding to the unknown data object based at least in part on the location information and at least one proximity query associated with the unknown data object and one or more other terms in the document index, the at least one proximity query being determined based at least in part on the syntax of the unknown data object, wherein the proximity confidence score indicates a confidence level associated with the at least one proximity query evaluating to true; and classify the unknown data object as an object in the data domain based at least in part on the syntactic confidence score and the proximity confidence score.

16. The at least one non-transitory computer-readable medium of claim 15, wherein the data domain comprises a sensitive data domain and further storing computer-readable instructions that, when executed by at least one of the one or more computing devices, cause at least one of the one or more computing devices to:

apply one or more security protections to at least a portion of the unstructured document.

17. The at least one non-transitory computer-readable medium of claim 15, wherein the instructions that, when executed by at least one of the one or more computing devices, cause at least one of the one or more computing devices to apply one or more security protections to at least a portion of the unstructured document further cause at least one of the one or more computing devices to:

apply data masking to instances of the unknown data object within the unstructured document.

18. The at least one non-transitory computer-readable medium of claim 15, wherein the instructions that, when executed by at least one of the one or more computing devices, cause at least one of the one or more computing devices to apply one or more security protections to at least a portion of the unstructured document further cause at least one of the one or more computing devices to:

encrypt the unstructured document.

19. The at least one non-transitory computer-readable medium of claim 15, wherein the instructions that, when executed by at least one of the one or more computing devices, cause at least one of the one or more computing devices to determine a syntactic confidence score corresponding to an unknown data object in the plurality of index terms based at least in part on a syntactic analysis of the unknown data object further cause at least one of the one or more computing devices to:

identify the syntax of the unknown data object based on one or more of: regular expression based pattern matching of the unknown data object, lookup of the unknown data object in a table of identified syntaxes, or probabilistic matching of the unknown data object to one of a plurality of syntaxes; and determine the syntactic confidence score based at least in part on the identified syntax.

20. The at least one non-transitory computer-readable medium of claim 15, wherein the instructions that, when executed by at least one of the one or more computing devices, cause at least one of the one or more computing devices to determine a proximity confidence score corresponding to the unknown data object based at least in part on the location information and at least one proximity query associated with the unknown data object and one or more other terms in the document index further cause at least one of the one or more computing devices to:

identify the at least one proximity query corresponding to the unknown data object based at least in part on the syntax of the unknown data object, the at least one proximity query indicating a query distance between a first query term corresponding to the unknown data object and at least one second query term corresponding to at least one of the one or more other terms;

determine an actual distance between the first query term and the at least one second query term based at least in part on the location information; and determine the proximity confidence score based at least in part on the determined actual distance and the query distance.

21. The at least one non-transitory computer-readable medium of claim 15, further storing computer-readable instructions that, when executed by at least one of the one or more computing devices, cause at least one of the one or more computing devices to:

determine a semantic confidence score based at least in part on a plurality of dictionary terms in the plurality of index terms, wherein the semantic confidence score indicates a confidence level associated with attributing one or more topics associated with the unstructured document to the data domain;

wherein the instructions that, when executed by at least one of the one or more computing devices, cause at least one of the one or more computing devices to classify the unknown data object as an object in the data domain further cause at least one of the one or more computing devices to classify the unknown data object as an object in the data domain based at least in part on the syntactic confidence score, the proximity confidence score, and the semantic confidence score.

* * * * *